(12) United States Patent
Breit

(10) Patent No.: US 10,948,422 B2
(45) Date of Patent: Mar. 16, 2021

(54) DEVICE FOR EMITTING ELECTROMAGNETIC RADIATION, IN PARTICULAR UV RADIATION

(71) Applicant: Marc Breit, Kleinblittersdorf (DE)

(72) Inventor: Marc Breit, Kleinblittersdorf (DE)

( * ) Notice: Subject to any disclaimer, the term of this patent is extended or adjusted under 35 U.S.C. 154(b) by 0 days.

(21) Appl. No.: 15/760,067

(22) PCT Filed: Sep. 15, 2016

(86) PCT No.: PCT/EP2016/071833
§ 371 (c)(1),
(2) Date: Mar. 14, 2018

(87) PCT Pub. No.: WO2017/046249
PCT Pub. Date: Mar. 23, 2017

(65) Prior Publication Data
US 2018/0252653 A1    Sep. 6, 2018

(30) Foreign Application Priority Data

Sep. 15, 2015   (WO) ................. PCT/EP2015/071140
Oct. 23, 2015   (DE) ..................... 10 2015 118 175.4

(51) Int. Cl.
*G01N 21/88*     (2006.01)
*G01N 21/64*     (2006.01)
(Continued)

(52) U.S. Cl.
CPC ..... *G01N 21/8806* (2013.01); *G01N 21/6447* (2013.01); *G01N 21/8803* (2013.01);
(Continued)

(58) Field of Classification Search
CPC ........... G01N 21/8806; G01N 21/6447; G01N 21/91; G01N 21/8803; G01N 2201/069;
(Continued)

(56) References Cited

U.S. PATENT DOCUMENTS

| 4,459,986 A | * | 7/1984 | Karaki | A61B 18/20 219/121.83 |
| 5,334,841 A | * | 8/1994 | Graessle | A61L 2/28 250/458.1 |

(Continued)

FOREIGN PATENT DOCUMENTS

| DE | 10326369 A1 | 1/2005 |
| DE | 102006004995 A1 | 10/2006 |

(Continued)

OTHER PUBLICATIONS

English Machine translation of Kobayashi JP-2000111476 (Year: 2000).*

*Primary Examiner* — Dominic J Bologna
(74) *Attorney, Agent, or Firm* — Lucas & Mercanti, LLP; Klaus P. Stoffel

(57) ABSTRACT

A device for emitting electromagnetic radiation, in particular UV radiation, including at least one radiating unit that only emits radiation at visible wavelengths. The device further includes a unit for detecting a functional error of the radiating unit. In practice, the radiating unit is provided for emitting only UV radiation and/or IR radiation and is formed by a light diode. The detection unit is designed to continuously monitor the radiating unit for functional errors, and the device includes an open-loop and/or closed-loop control unit which is provided to automatically switch off the radiating unit and/or display the functional error, upon detection of the functional error by the detection unit.

14 Claims, 2 Drawing Sheets

(51) Int. Cl.
*G01N 21/91* (2006.01)
*F21V 1/00* (2006.01)

(52) U.S. Cl.
CPC .......... *G01N 21/91* (2013.01); *F21L 2001/00* (2013.01); *G01N 2201/061* (2013.01); *G01N 2201/069* (2013.01); *G01N 2201/0624* (2013.01); *G01N 2201/06146* (2013.01); *G01N 2201/06153* (2013.01)

(58) Field of Classification Search
CPC . G01N 2201/0624; G01N 2201/06153; G01N 2201/06146; G01N 2201/061; F21L 2001/00
See application file for complete search history.

(56) References Cited

U.S. PATENT DOCUMENTS

| | | | | |
|---|---|---|---|---|
| 5,804,822 | A * | 9/1998 | Brass | G01N 21/91 250/302 |
| 6,132,072 | A | 10/2000 | Turnbull et al. | |
| 6,433,345 | B1 * | 8/2002 | Hayashi | A61B 1/043 250/458.1 |
| 7,301,346 | B2 | 11/2007 | Annighoefer et al. | |
| 8,616,722 | B2 | 12/2013 | Duerr et al. | |
| 2002/0093649 | A1 * | 7/2002 | Brass | G01N 21/91 356/237.1 |
| 2003/0218137 | A1 * | 11/2003 | Sendai | A61B 5/0086 250/461.1 |
| 2004/0104355 | A1 * | 6/2004 | DiFoggio | E21B 49/08 250/461.1 |
| 2004/0114134 | A1 * | 6/2004 | Fliss | G01M 11/005 356/239.2 |
| 2005/0083687 | A1 * | 4/2005 | Brass | G01N 21/6402 362/231 |
| 2006/0124861 | A1 * | 6/2006 | Hegmegi | C02F 1/008 250/453.11 |
| 2006/0218987 | A1 * | 10/2006 | Campman | G01N 33/0047 73/23.2 |
| 2007/0014195 | A1 * | 1/2007 | Annighofer | G01N 21/91 369/13.02 |
| 2007/0061210 | A1 | 4/2007 | Wilkinson | |
| 2009/0200477 | A1 * | 8/2009 | Takabatake | H04N 1/0314 250/370.08 |
| 2011/0050123 | A1 * | 3/2011 | Duerr | F21V 21/084 315/294 |
| 2011/0211350 | A1 | 9/2011 | Klipstein | |
| 2011/0001431 | A1 | 12/2011 | Weber | |
| 2013/0260405 | A1 * | 10/2013 | Nishino | G01N 21/645 435/23 |
| 2014/0225514 | A1 | 8/2014 | Pickard | |

FOREIGN PATENT DOCUMENTS

| | | |
|---|---|---|
| DE | 102004043295 B4 | 4/2007 |
| DE | 102009029930 B3 | 11/2010 |
| DE | 202014007579 U1 | 10/2014 |
| EP | 1623213 B1 | 11/2010 |
| JP | 2000111476 A * | 4/2000 |

* cited by examiner

DEVICE FOR EMITTING ELECTROMAGNETIC RADIATION, IN PARTICULAR UV RADIATION

The present application is a 371 of International application PCT/EP2016/071833, filed Sep. 15, 2016, which claims priority of International application PCT/EP2015/071140, filed Sep. 15, 2015, and DE 10 2015 118 175.4, filed Oct. 23, 2015, the priority of these applications is hereby claimed and these applications are incorporated herein by reference.

BACKGROUND OF THE INVENTION

The invention pertains to a device for emitting electromagnetic radiation, in particular UV radiation, which comprises at least one radiating means which emits radiation only at invisible wavelengths.

Lamps which comprise ultra-violet radiation-emitting LEDs are known from DE 10 2004 043 295 B4, EP 1 623 213 B1, and U.S. Pat. No. 8,616,722 B2. They are used for visual inspections of workpiece surfaces, in particular for the detection of contaminants, for dye penetrant inspection, and for fluorescent magnetic powder inspection.

In the case of visual inspection, in particular for the inspection of workpiece surfaces by the fluorescent dye penetrant method, defects on workpiece surfaces are made visible by exposing a fluorescent agent to ultraviolet radiation. The inspection is usually carried out in the dark, e.g., at an ambient illumination intensity of less than 20 Lux, because, in terms of visual perception, the sensitivity of the human eye to contrast is increased under mesopic viewing conditions (twilight vision) and scotopic viewing (night vision); thus more effective testing can be carried out when there is high contrast between the surface to be studied and the stimulated fluorescence.

SUMMARY OF THE INVENTION

The invention is based on the goal of creating a device of the type cited above which can be used only when it is functioning correctly.

A device which achieves this goal is characterized in that the device comprises a unit for detecting a malfunction of the radiating means.

The invention solves the problem that, when the known devices are used, it is often not immediately evident when the radiating means emitting the invisible light radiation has started to malfunction, because the human eye does not immediately perceive, for example, a decrease in light intensity, a change in the wavelengths of the radiation, flickering, a partial failure of the radiating means, or a change in wavelength or in the wavelength range at which the radiating means is radiating.

The detection unit capable of detecting malfunctions creates the possibility of taking suitable measures when a malfunction occurs. When the device is used, therefore, it is possible to avoid the occurrence of problems resulting from a malfunction, e.g., to avoid the failure to identify defects or, when the device is used to dry objects or to cure materials, the failure to dry or to cure in the manner intended.

In a preferred embodiment of the invention, the radiating means, which is preferably provided for the purpose of emitting only UV radiation (wavelength range, 200-400 nm), blue-violet radiation (wavelength range, 380-490 nm), and/or IR radiation (wavelength range, 780-50 µm), is formed by at least one light-emitting diode (LED), preferably by several light-emitting diodes. It is relatively easy to detect a malfunction of the conventional mercury vapor lamps used to emit UV radiation, because they are either operating correctly or have totally failed; conversely, in the case of light-emitting diodes, the problem occurs frequently that their radiation intensity changes, e.g., the radiation intensity fluctuates or the light-emitting diode flickers. The invention thus proves to be especially advantageous for devices with light-emitting diodes. In addition, when the device comprises several light-emitting diodes as radiating means, it is possible to detect a malfunction of a only single light-emitting diode or that of only a few diodes, the light intensity being decreased in either case.

In one embodiment of the invention, the detection unit is set up to monitor the radiating means continuously for malfunctions, wherein the device preferably is checked at regular time intervals of, for example, every 10 ms, for malfunctions. It is advantageous that, as a result, the malfunctions can be detected even when they occur only after the device has been put into operation, in particular during the use of the device.

In an especially preferred embodiment of the invention, the device is set up to switch off the radiating means automatically when the detection unit detects a malfunction. The device is advisably provided with an open-loop or closed-loop control unit, which switches off the device or the radiating means upon detection of a malfunction. If, for example, a malfunction is detected in one of several circuits which supply the radiating means with power and in each of which preferably one or more LEDs are arranged, not only the one circuit but rather all circuits are switched off so that the radiating means as a whole can no longer emit radiation. This advantageously excludes the possibility that work can continue to be carried out with a not-fully-functional device. Testing errors, especially errors in visual inspection, are avoided.

The device, or preferably the open-loop or closed-loop control unit, is advisably set up to indicate the malfunction as soon as it is detected; this can be done by means of, for example, an optical, tactile, or acoustic warning signal. It would be possible, for example, for information on the malfunction, i.e., information which characterizes the malfunction, to be displayed on a viewscreen. For example, the individual light-emitting diode which is not functioning properly and/or the type of malfunction such as flickering, failure, or the like, could be displayed. The detection unit can be provided to send a signal to the open-loop or closed-loop control unit upon detection of a malfunction.

In a further elaboration of the invention, the detection unit for monitoring is set up:

to measure an electrical voltage drop at the radiating means;

to measure an electrical current flowing through the radiating means;

to measure the heating produced by the radiating means or a temperature of the device, preferably near the radiating means;

to measure an intensity with which the radiating means is emitting radiation; and/or to measure the wavelength and/or the wavelength range of radiation which is being emitted by the radiating means.

If several radiating means are to be arranged and connected in a common circuit, the voltage drop or current through the entire circuit could also be measured. To measure the heating, the detection unit advisably comprises a temperature sensor, preferably a platinum precision resistor, which is arranged on or near the radiating means. It has been found to be especially effective to arrange the temperature sensor on a component of the device which carries the radiating means; this carrier preferably consists of a metallic cooling body or is connected to the cooling body. For the measurement of the intensity and/or for the measurement of the wavelength or wavelength range of the radiation, the detection unit is advisably provided with a radiation sensor, preferably a photocell, a photodiode, a phototransistor, or a CMOS or CCD sensor.

The radiating means is advisably provided preferably with a filter for adjusting the wavelength range in question.

In a further elaboration of the invention, the device comprises, in addition to the radiating means, a means for emitting visible light, preferably white light. Thus it is possible to switch between illumination with visible light and illumination with invisible light so that, for the visual inspection, it is possible to obtain a view under white light and then to change to a view with invisible light. The device is advisably set up, upon detection of the malfunction by the detection unit, to switch off automatically not only the radiating means but also the means for emitting visible light.

The device is preferably set up to change the intensity at which the radiating means emits its radiation independently of the intensity at which the visible light-emitting means emits. The intensity of an individual radiating means is, or the intensities of all the radiating means are, advisably adjustable separately.

In one embodiment of the invention, the device is set up to increase or to decrease the intensity of at least one of the radiating means and simultaneously to keep constant the intensity of at least one of the other radiating means or to increase or to decrease the intensity of that other means in a manner opposite to that of the first-mentioned radiating means. By means of such intensity changes, it is possible, first, to add one radiating means to another and, second, to superimpose the wavelength range of one radiating means onto the wavelength range of another.

The previously mentioned open-loop or closed-loop control unit, furthermore, is advisably provided to adjust the intensity at which the radiating means and possibly the emission unit emit their radiation. The open-loop or closed-loop control unit preferably comprises at least one constant-current controller, which functions on the basis of electrical and electronic switching and control circuits. The radiating means, in particular the LEDs, can thus be operated in an especially efficient manner, because, by means of the constant-current controller, the operating current of the radiating means in question, in particular the LEDs or the LED circuit, can be measured and kept constant within narrow limits. The constant-current controller can advisably generate the constant current from an alternating and/or direct-current voltage. The intensity with which the LEDs radiate is preferably changed by the use of pulse-width modulation. The device preferably comprises for this purpose a pulse-width modulation controller. Alternatively or in addition, it would also be possible to change the current intensity.

In addition, the open-loop or closed-loop control unit can comprise an automatic control circuit which can reduce or turn off the power to the device or to individual parts of the device as a function of temperature in order to protect the device, especially the radiating means and/or the open-loop or closed-loop control unit, from overheating. For cooling, the device could, alternatively or in addition, be provided with a fan, which can be regulated in an open-loop or closed-loop manner by the open-loop or closed-loop control unit. The device is also advisably set up to detect a malfunction and to conduct the corresponding monitoring, preferably by means of the detection unit or the open-loop or closed-loop control unit.

The device is advisably set up to indicate an operating state of the radiating means or, if several radiating means are provided, to indicate the operating state of each of the radiating means. Alternatively or in addition, it can be provided that the device indicates whether the radiating means in question is emitting radiation or not, i.e., in particular whether it is switched on or off.

In yet another embodiment of the invention, the device comprises an adjusting device, which is provided to regulate the intensity of the radiation emitted by the radiating means in question as a function of a temperature of the device. This offers the advantage that it is possible to compensate for the decrease in the intensity which occurs with a rise in temperature The device advisably comprises at least one housing, which is preferably provided to accommodate the radiating means; at least one operating element; at least one optical system, which preferably comprises at least one lens; and/or at least one cooling means, preferably a fan, a heat exchanger, and/or a cooling plate.

In one embodiment of the invention, the device can be used in a mobile and/or stationary mode. It can be a hand-held or stand-mounted device, or it can be, for example, a device permanently installable on a bracket or a wall.

Whereas, in an especially preferred embodiment of the invention, a unit for operating the device is integrated into the housing, it would also be conceivable that such a unit could be provided outside the housing, wherein the device preferably comprises at least a housing for the radiating means, at least one control panel or switch housing, and/or at least one operating element. It is advisable for the operating unit to comprise at least one hand-actuated or foot-actuated operating element, by means of which the intensity of at least one of the radiating means can be changed.

Power can be supplied to the device by at least one external or integrated direct-current and/or alternating-current source.

BRIEF DESCRIPTION OF THE DRAWING

The invention is explained in greater detail below on the basis of an exemplary embodiment and the attached drawings pertaining to the exemplary embodiment.

DETAILED DESCRIPTION OF THE INVENTION

Figure 1:
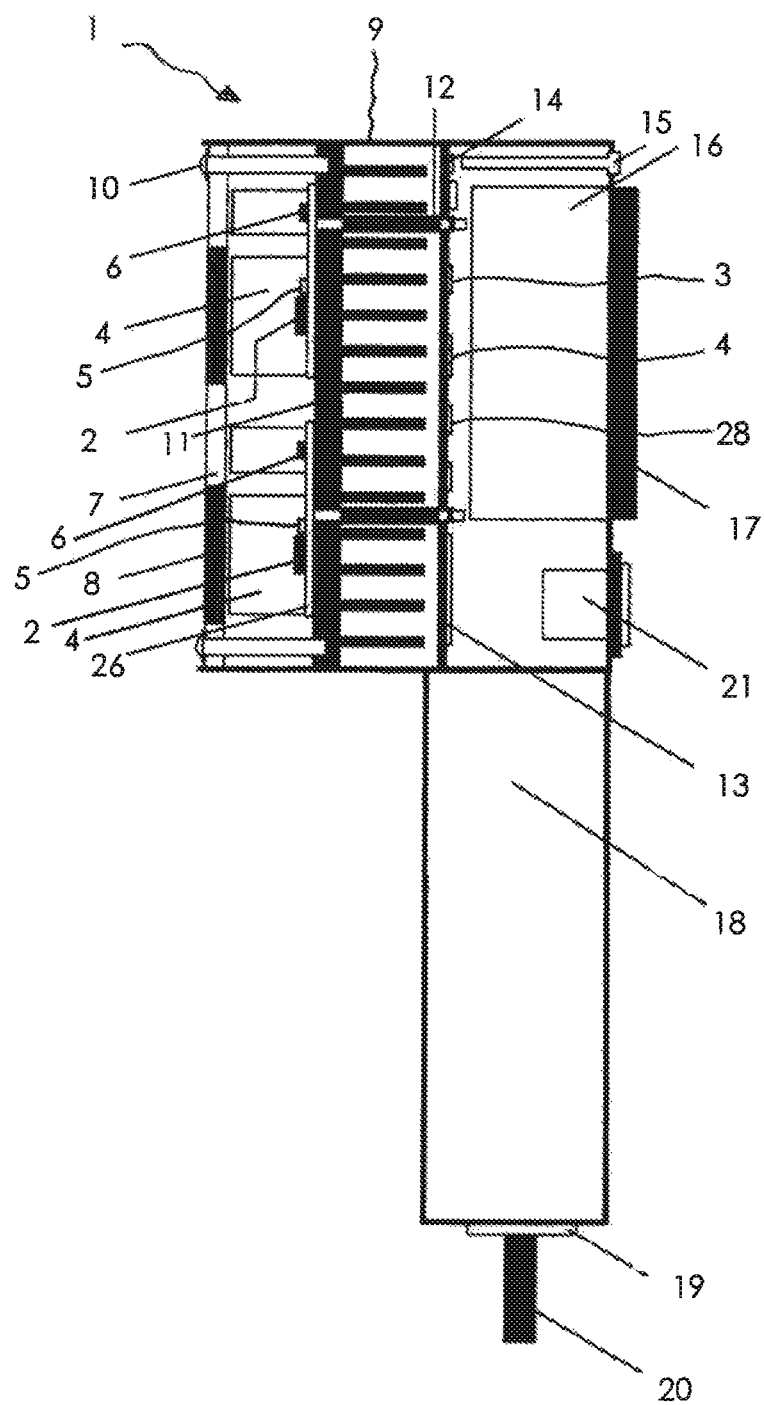
FIG. 1 shows a lateral cross section through a device according to the invention.
Figure 2:
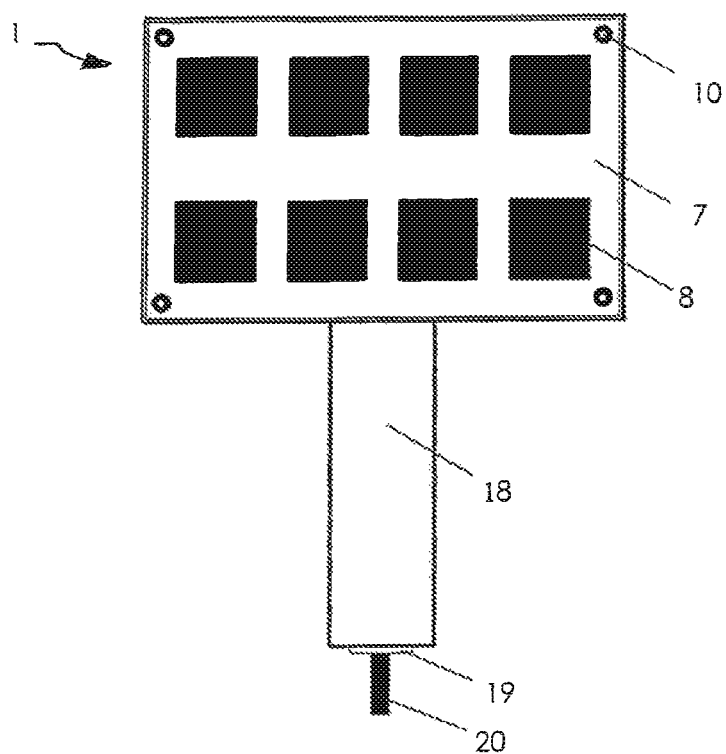
FIG. 2 shows a front view of the device according to FIG. 1.
Figure 3:
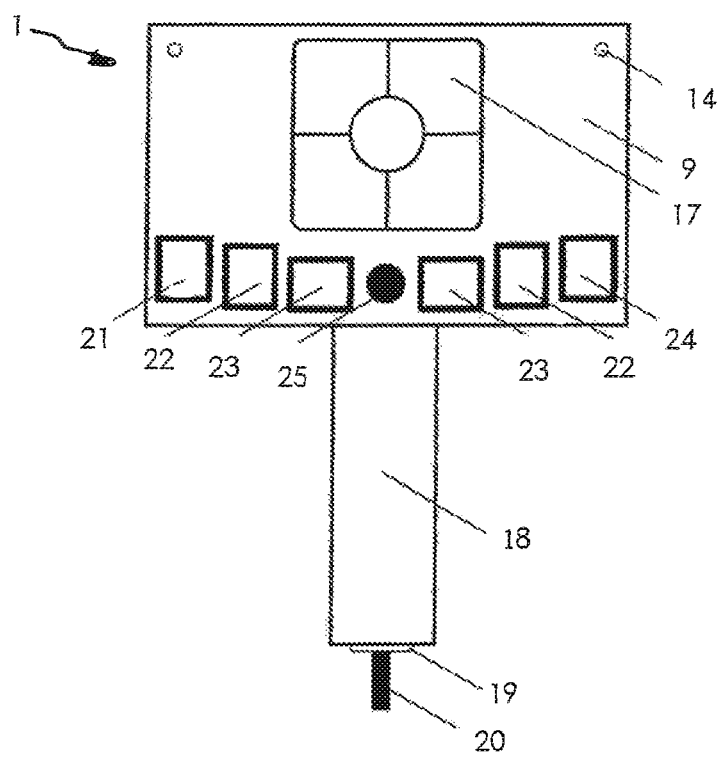
FIG. 3 shows a rear view of the device according to FIG. 1.

A device 1 according to the invention shown in FIGS. 1-3 comprises eight UV-LEDs 2, which are provided to emit UV radiation (wavelength range, 200-400 nm), and eight white-light LEDs 6, which are provided to emit white light (wavelength range, 380-780 nm). In front of the LEDs 2, 6, optical components 4 are arranged to influence the associated paths of the radiation emitted by the LEDs. Behind the optical components 4 (i.e., "behind" with respect to the direction of the radiation), a front window 7 is arranged, which is connected by fastening means 10 to a housing 9 of the device 1 and which is provided with filters 8 for each of the UV-LEDs 2.

The LEDs 2, 6 are soldered onto a carrier circuit board 26, which is arranged on a cooling body 11. The cooling body 11 is connected by spacer pins 12 to a circuit board 13, which carries several electronic components such as microcontrollers. Also on the circuit board 13 is an indicator LED 14, which, as will be explained in greater detail below, is provided to indicate an operating state of the device 1. A light guide 15, by means of which light can be conducted from the indicator LED 14 to the rear, is arranged between the rear of the housing 9 and the indicator LED 14.

A temperature sensor such as a platinum precision resistor is arranged on the carrier circuit board 26 directly next to each of the UV-LEDs 2; this sensor measures the temperature, so that the degree of heating which has occurred as a result of the associated UV-LEDs 2 can be determined.

In addition, an optical sensor (not shown) such as a CCD sensor can be arranged on the inside surface of the front panel 7, e.g., facing but laterally offset from each of the UV-LEDs 2.

The electronic components form an open-loop and/or closed-loop control unit 4, which is set up to control and/or automatically to regulate the intensities at which the LEDs 2, 6 emit their radiation. The open-loop and/or closed-loop control unit 4 is also provided to change, separately from each other, the intensities at which the UV-LEDs 2 and the white-light LEDs 6 emit radiation by means of pulse-width modulation and/or by changing the amount of current supplied to them.

The electronic components also form a detection unit 3, which is connected to the temperature sensor 5 to detect malfunctions during the operation of the device 1.

The detection unit 3 is also wired in such a way that it can determine the voltage drop at each of the individual UV-LEDs 2 as well as the currents which are flowing through the UV-LEDs 2, wherein, under certain conditions, data which is available in the open-loop and/or closed-loop control unit can be accessed. If a UV-LED circuit comprising several UV-LEDs 2 is provided, the voltage drop and/or the current for the entire UV-LED circuit can be measured.

If a malfunction occurs in one of the UV-LEDs 2, such as a flickering, a decrease in light intensity, or a complete failure of a UV-LED 2, the detection unit 3 detects this on the basis of the reduced current or the absence of current flowing through the associated UV-LED 2 and/or on the basis of a change in the voltage drop at the UV-LED. Alternatively or in addition, it can be provided that the detection unit 3 is connected to the temperature sensors 5 and detects the malfunction on the basis of a comparatively low temperature or a change in the measured temperature.

In addition, the detection unit 3, alternatively or in addition to the current and/or voltage measurement and/or to the temperature measurement, can be set up to use the optical sensor to determine the intensity of the radiation emitted by the UV-LEDs 2 and possibly its wavelengths or wavelength range.

The detection unit 3 is wired in such a way that the device 1, upon the discovery of a malfunction of the UV-LEDs 2, transmits a signal to the open-loop and/or closed-loop control unit 4, which then switches off all the UV-LEDs 2 and possibly in addition produces a preferably optical, tactile, or acoustic warning signal to indicate the malfunction. It is also possible for the control unit to be set up to characterize the malfunction by displaying a code by means of the indicator LED 14 or some other indicator device.

If various circuits are provided in the device 1 for the UV-LEDs 2 and if a malfunction is discovered in only one or simultaneously in several individual circuits, all of the circuits for the UV-LEDs 2 are switched off so that the UV-LEDs 2 can no longer emit radiation.

In addition, the discovery of a malfunction by the open-loop and/or closed-loop control unit 4 could shut down the entire device 1.

The electronic components on the circuit board 13 also form an adjusting unit 28; this unit is provided to control automatically the power levels at which the LEDs 2, 6 emit radiation as a function of a temperature of the device 1 for the purpose of compensating for the change in the current intensity which occurs when the device 1 heats up and to adjust the intensities in question to match the specified values.

A fan 16 is provided to cool the device 1; this fan can be used to blow air onto the circuit board 13 and the cooling body 11. The housing 9 is provided on its rear surface with a ventilation grille 17, which is intended to accept a filter and through which the air is drawn in by the fan 16.

The device 1 also comprises a handle 18, into the lower end of which, by way of a strain-relief device 19, a power cord 20 is guided, through which the device 1 can be supplied with energy and possibly controlled.

As can be seen especially clearly in FIG. 3, the device 1 is provided on its rear surface with buttons 21, 22, 23, 24 and a rotary controller 25, which are provided to control the intensities at which the LEDs 2, 6 light up and which cooperate with the open-loop and/or closed-loop control unit 4.

The invention claimed is:

1. A lamp configured for an inspection of workpiece surfaces, comprising: at least one light-emitting diode configured to emit radiation only at invisible wavelengths and arranged to illuminate the workpiece surfaces with radiation only at invisible wavelengths; an emitter configured to emit visible light and arranged to illuminate the workpiece surfaces with visible light; and a detection unit for detecting a malfunction of the light-emitting diode, wherein the lamp is configured to automatically switch off the lamp or at least the light-emitting diode upon detection of the malfunction by the detection unit, wherein the light emitting diode and the emitter are arranged to emit radiation and light in a common direction.

2. The lamp according to claim 1, wherein the light-emitting diode only emits UV radiation and/or IR radiation.

3. The lamp according to claim 1, wherein the detection unit is set up to continuously monitor the light-emitting diode for malfunctions.

4. The lamp according to claim 1, wherein the lamp is operative to indicate that a malfunction is present.

5. The lamp according to claim 1, further comprising a measuring unit for measuring an electrical voltage drop at the light-emitting diode.

6. The lamp according to claim 5, wherein the measuring unit is arranged to measure an electrical current flowing through the light-emitting diode.

7. The lamp according to claim 5, wherein the measuring unit is configured to
measure heating caused by the light-emitting diode,
measure intensity at which the light-emitting diode is emitting radiation, and/or
measure a wavelength and/or a wavelength range of the radiation emitted by the light-emitting diode.

8. The lamp according to claim 1, wherein the lamp is configured to change an intensity at which the light-emitting diode radiates, independently of an intensity at which the emitter radiates.

9. The lamp according to claim 8, wherein the emitter emits white light.

10. The device according to claim 1, wherein the lamp is configured for detection of contaminants, for dye penetrant inspection, and/or for fluorescent magnetic powder inspection.

11. A method for visual inspection of a workpiece surface comprising the steps of: providing a lamp according to claim 1; and directing the radiation from the light-emitting diode and the visible light from the emitter at the workpiece surface in a common direction.

12. The method according to claim 11, including using the lamp for detection of contaminants, for dye penetrant inspection, and/or for fluorescent magnetic powder inspection.

13. A method for operating a lamp configured for an inspection of workpiece surfaces, which comprises at least one light-emitting diode configured to emit radiation only at invisible wavelengths and arranged to illuminate the workpiece surfaces only at invisible wavelengths and an emitter configured to emit visible light and arranged to illuminate the workpiece surfaces with visible light, the method comprising the steps of: directing the radiation from the light-emitting diode and the visible light from the emitter in a common direction at the workpiece surface; detecting malfunctions of the light-emitting diode using a detection unit; and automatically switching off the lamp or at least the light-emitting diode upon detection of a malfunction by the detection unit.

14. The method according to claim 13, further including indicating presence of a malfunction.

* * * * *